United States Patent
Bayne

(10) Patent No.: US 8,135,640 B2
(45) Date of Patent: Mar. 13, 2012

(54) SYSTEM AND METHOD FOR MAKING A SYNTHETIC CASH ADVANCE USING A PURCHASE PAYMENT EXCHANGE

(76) Inventor: Anthony Jeremiah Bayne, Lomita, CA (US)

(*) Notice: Subject to any disclaimer, the term of this patent is extended or adjusted under 35 U.S.C. 154(b) by 190 days.

(21) Appl. No.: 12/256,453

(22) Filed: Oct. 22, 2008

(65) Prior Publication Data

US 2009/0216637 A1 Aug. 27, 2009

Related U.S. Application Data

(60) Provisional application No. 61/031,694, filed on Feb. 27, 2008, provisional application No. 61/039,107, filed on Mar. 25, 2008.

(51) Int. Cl.
*G06Q 40/00* (2012.01)
(52) U.S. Cl. ............ 705/36 R; 705/35; 705/39
(58) Field of Classification Search .......... 705/35–38, 705/36 R, 39
See application file for complete search history.

(56) References Cited

U.S. PATENT DOCUMENTS

| | | | |
|---|---|---|---|
| 6,021,397 A * | 2/2000 | Jones et al. | 705/36 R |
| 6,609,113 B1 | 8/2003 | O'Leary et al. | |
| 7,089,208 B1 | 8/2006 | Levchin et al. | |
| 7,191,151 B1 | 3/2007 | Nosek | |
| 2001/0042785 A1* | 11/2001 | Walker et al. | 235/379 |
| 2004/0117302 A1* | 6/2004 | Weichert et al. | 705/40 |
| 2005/0203824 A1* | 9/2005 | Freud et al. | 705/37 |
| 2006/0289631 A1 | 12/2006 | Stretch et al. | |
| 2007/0174166 A1 | 7/2007 | Jones | |
| 2007/0214049 A1* | 9/2007 | Postrel | 705/14 |
| 2008/0133351 A1* | 6/2008 | White et al. | 705/14 |
| 2009/0048973 A1* | 2/2009 | DeCristoforo | 705/44 |

* cited by examiner

*Primary Examiner* — Olabode Akintola

(57) ABSTRACT

System and method provide for making a synthetic cash advance to a credit cardholder via a purchase-payment exchange. A beneficiary selects an item to be purchased by a cardholder for the beneficiary, and in exchange for the cardholder's purchase, the beneficiary transfers funds to the cardholder in an amount that is less than the purchase price of the item. Using this invention, the beneficiary receives the selected item, has a payment made at a discount, and the cardholder receives cash at the card's purchase interest rate. Two or more cardholders may be allowed to bid to make the beneficiary's purchase or payment. The winning bid may be selected based on the cardholder bid having the largest discount from the purchase price.

19 Claims, 2 Drawing Sheets

SYSTEM AND METHOD FOR MAKING A SYNTHETIC CASH ADVANCE USING A PURCHASE PAYMENT EXCHANGE

RELATED APPLICATION

This application is based on and claims priority to U.S. Provisional Patent Application No. 61/031,694, filed Feb. 27, 2008, and U.S. Provisional Patent Application No. 61/039,107, filed Mar. 25, 2008, the entire disclosures of which are hereby incorporated by reference.

BACKGROUND OF THE INVENTION

Field of the Invention

The present invention generally relates to a system and method for exchanging value, and more particularly to a system and method for processing a purchase-payment exchange that enables a credit cardholder to obtain a synthetic cash advance.

A consumer has several online payment methods to choose from (e.g. credit card, electronic fund transfer (EFT), etc.) when making a purchase online. An online payment solution provider, such as Pay Pal (RTM), may be used by the consumer to shield his financial information.

A credit card (not including so called "prepaid" and "secured" credit cards) having a cash advance feature, will have two credit limits, a greater "purchase credit limit" to make purchases, and a lesser included "cash advance limit" to use in obtaining cash. Such a credit card will also have two different interest rates; a cash advance interest rate and a purchase interest rate. The cash advance interest rate is usually higher than the purchase interest rate. A cardholder using the cash advance feature will typically have to pay an additional "transaction fee" of 1-3% of the amount advanced, with a set minimum transaction fee amount (e.g. $50.00).

A cardholder who wants a small amount of cash (e.g. $200.00), may not use the card's cash advance feature when the minimum transaction fee (example $50.00) is too large in relation to the amount of cash desired. Therefore, a need remains for a cardholder to acquire a small sum of cash with an accompanying smaller transaction cost, using his/her credit card.

Since an existing cardholder client may choose a "payday loan" service to obtain a cash loan instead of using a credit card's cash advance feature, a need remains to provide card issuers a means of giving cardholder clients greater flexibility in obtaining cash loans using a credit card issuers, so that card issuers can more effectively compete against payday loan businesses.

SUMMARY Of CERTAIN INVENTIVE ASPECTS

The present invention meets the above described needs by allowing a credit cardholder to use his credit card to pay a bill, or purchase an item online (collectively "financial transaction") for a third-party beneficiary (hereinafter "beneficiary"), in exchange for the beneficiary making an electronic fund transfer to the cardholder in an amount that is less than the credit amount used by the cardholder to complete the financial transaction. This purchase-payment exchange effectively allows the cardholder to obtain a synthetic cash advance at the credit card's lower purchase interest rate.

Further, the invention enables the cardholder to obtain cash for less than the credit card's minimum "transaction fee", by the cardholder setting a "maximum cardholder discount" (i.e. the difference between what the cardholder is willing to pay for a purchase of an item and the amount the cardholder is willing to accept for making the purchase) that is less than the card's minimum transaction fee. Additionally, since the cardholder makes a "purchase" to receive cash from the beneficiary, and not from the card issuer, the cardholder may be able to obtain more cash than a credit card's "cash advance limit", namely cash equal to the card's greater "credit purchase limit" amount.

Additionally, the invention also allows a beneficiary to obtain an item, or have a payment made for him, at a discount.

Payday loan services usually require the borrower to repay a loan within one or two borrower pay periods (e.g. a month, if the borrower is paid bimonthly). It is well known that costs expressed as an annual percentage rate (APR) for payday loans are sometimes as high as 300%. Since credit card issuers typically provide a longer payback period and a lower APR on purchases than pay day loans, the invention will enable credit card issuers to compete against payday loan services by providing better repayment terms in making cash loans.

In a preferred embodiment, an online payment solution provider (hereinafter "OPS") using a Payment Purchase Exchange System (PPES) as disclosed herein, acts as a facilitator to assist a beneficiary, online merchant, financial institution, and a credit cardholder (collectively "participants") complete a purchase-payment exchange. The OPS using the Payment Purchase Exchange System authenticates participants' identities, establishes participant accounts, validates financial account ownership, issues PIN(s), authorizes transactions on behalf of participants, etc. The OPS may charge an account set-up fee, and a transaction fee for facilitating a purchase-payment exchange.

A trusted OPS (e.g. a state-licensed money transmitter, escrow company, online/offline auction company etc.) using the disclosed purchase-payment exchange system will give confidence to participants, and increase the number of beneficiary and cardholder bid requests submitted and fulfilled. While a beneficiary and a cardholder using this invention may enter into a purchase-payment exchange directly with each other, without an OPS (for example, by posting a beneficiary's bid request (hereinafter "beneficiary bid") and contact information on an internet billboard, and being contacted by a credit cardholder with a conforming bid to complete a purchase-payment exchange, etc.), more transactions will likely occur when a trusted OPS facilitates a purchase-payment exchange.

The system and method of the invention each have several aspects, no single one of which is solely responsible for its desirable attributes. Without limiting the scope of this invention as expressed by the claims which follow, it's more prominent features will now be discussed briefly. After considering this discussion, and particularly after reading the section entitled "Detailed Description of Certain Embodiments", one will understand how the features of this invention provide advantages that include a purchase-payment exchange system that enables a credit cardholder to obtain a synthetic cash advance, a card issuer to obtain new loan business from an existing cardholder, a beneficiary to have an item purchased/payment made on his behalf at a discount, and an OPS to earn additional revenue for providing a new service.

One embodiment is a system for a credit cardholder to obtain a synthetic cash advance in exchange for completing a financial transaction for a beneficiary. The system comprises a means for a cardholder to submit a cardholder bid to complete a financial transaction for a beneficiary using the cardholder's credit card, in exchange for receiving an electronic funds transfer in an amount that is less than the proposed financial transaction, means to select the cardholder bid, means for the cardholder to complete the financial transaction for the beneficiary, and means for making an electronic fund transfer to the cardholder.

Another embodiment is a method for a beneficiary to obtain an item at a discount. The method comprises receiving a beneficiary's bid request to make a purchase of an item for the beneficiary, and receiving a cardholder's conforming bid. The method further comprises using the cardholder's credit card to complete the purchase, and paying the cardholder with an amount of money that is less than the purchase price, in exchange for making the purchase.

Another embodiment is a method for an online payment solution provider to facilitate a purchase-payment exchange between a beneficiary and a cardholder, comprising, receiving a beneficiary's bid, including a request to have an item purchased by a cardholder for the beneficiary, in exchange for an amount of cash that is less than the price of the item to be purchased. Further, receiving a credit cardholder's conforming bid, selecting the cardholder's conforming bid, paying for the purchase using the cardholder's credit card, and making an electronic fund transfer to the cardholder in an amount that is less than the amount of credit used by the cardholder to complete the purchase for the beneficiary.

These and other features, aspects and embodiments of the invention will be described in more detail below.

DETAILED DESCRIPTION OF CERTAIN EMBODIMENTS

Figure 1:
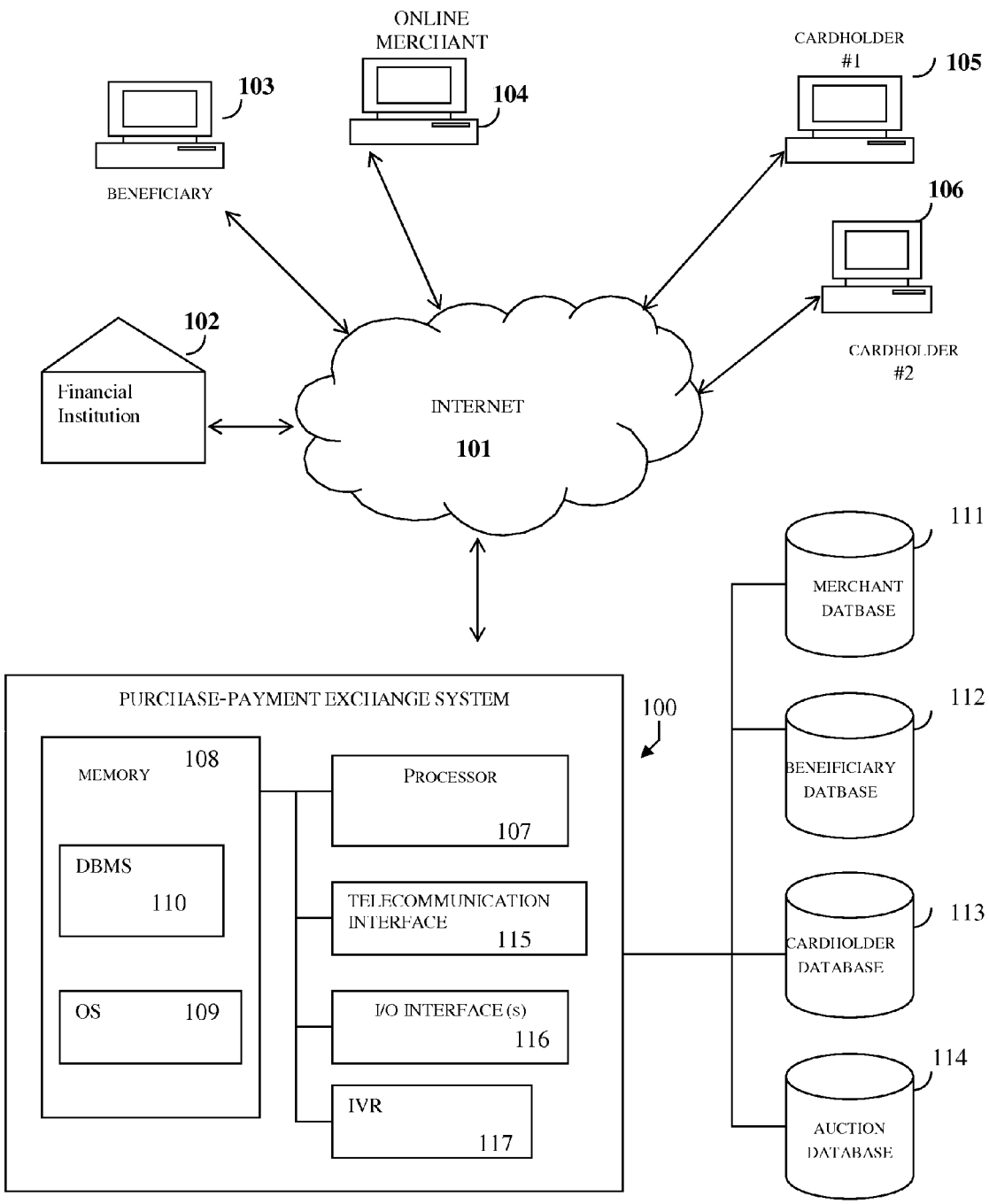
FIG. 1 is a block diagram illustrating an exemplary system in accordance with certain embodiments of the present invention.

Exemplary embodiments of the present invention will hereinafter be described with references to the figures, in which like numerals indicate elements throughout the several drawings. FIG. 1 is a block diagram illustrating an exemplary operating environment for implementation of certain embodiments of the present invention. The exemplary operating environment includes a purchase-payment exchange system (PPES) 100 of the present invention. The PPES 100 is linked via an internet network 101 to at least one financial institution 102, a beneficiary 103, an online merchant 104, and a credit cardholder 105. When a second credit cardholder 106 submits a cardholder bid, the second credit cardholder 106 is likewise linked to the PPES 100. The PPES 100 may be hosted by an Online Payment Solution Provider ("OPS", not shown). As used herein, the term "financial institution" 102 should be interpreted broadly to include any State or Federal savings and loan association, a mutual savings bank, a State or Federal credit union, or any other person or entity who, directly or indirectly, holds a financial (e.g. demand deposit, brokerage, etc.) account belonging to a customer.

The PPES 100 has a processor 107, and a memory 108 for storing data coupled to the processor 107. The processor 107 is configured to act as gatekeeper for using the PPES 100 by determining who (e.g. a beneficiary 103, cardholder 105) is a registered user of the PPES 100. For example, a cardholder 105 attempting to access the PPES 100 via an OPS's website (not shown), may be prompted to provide a user name and password, or to register as a new user, before being allowed to submit a bid request, see a bid, etc.

The PPES 100 is contemplated as being a processor 107 driven device, or a collection of devices, that is configured for enrolling, verifying, and authenticating participants, and conducting auctions. The PPES 100 may further be configured for accessing and reading associated computer readable media having stored thereon data/and or computer executable instructions for implementing the various methods of the present invention. In particular, the processor 107 provides the business logic for the PPES 100 that supports and provides an environment for server side logic, expressed as objects, rules and computations, such as selecting a winning bid from a plurality of submitted cardholder 105 & 106 bids.

Additionally, the PPES 100 may have a telecommunication interface 115, and an interactive voice response unit (IVR) 117, so for example, a beneficiary 103 and/or cardholder 105 may call in a bid to the PPES 100 and input menu options (e.g. submit a bid) using voice, or touchtone commands.

The PPES 100 memory 108 may take the form of any computer readable medium. The memory 108 may be logically and/or physically divided into multiple units. The memory 108 stores data and program modules, such as, for example, an operating system ("OS") 109, a database management system ("DBMS") 110. These and/or other programs may be executed by the PPES 100 to perform the various methods of the present invention.

The PPES 100 may include, or be in communication with, one or more searchable databases. By way of illustration only, the PPES 100 may be in communication with an online merchant database 111, a beneficiary database 112, a credit cardholder database 113, and an auction database 114. These and/or other databases may also store any other data used or generated by the PPES 100. Those skilled in the art will appreciate that the illustrated database may be physically and/or logically separate from one another.

The PPES 100 may also include input/output ("I/O") interfaces 116 for providing logical connections to various I/O devices, such as a scanner, a mouse, etc. A system administrator may utilize these and other I/O devices to interact with the PPES 100. For example, a system administrator may interact with the PPES 100 to populate and edit the beneficiary database 112, and other program modules. Those skilled in the art will appreciate that the PPES 100 may include alternate and/or additional components, hardware or software.

Thus configured or similarly configured, the PPES 100 may provide a means for a beneficiary 103 to have a financial transaction completed for his/her benefit at a discount, in exchange for transferring funds to a cardholder 105 that are less than the credit used by the cardholder 105 to complete the financial transaction, when the PPES 100 is programmed to interact with a beneficiary 103, an online merchant 104, a cardholder 105, and a financial institution 102, using the PPES 100 via an internet network 101. A credit card issuer (not shown) may obtain new loan business (i.e. credit card purchases for a beneficiary 103) from an existing cardholder 105, the credit cardholder 105 gets cash at the credit card's purchase rate, and the OPS may earn a commission/fee for facilitating the purchase payment transaction via the PPES 100.

Participants may access the PPES 100 to update information databases 111-114, submit bid requests, select a bid range, add a credit card, etc. via an OPS website (not shown). Additionally, the PPES 100 may access the beneficiary database 112 and cardholder database 113 to check for updated information.

A person (e.g. beneficiary 103 or cardholder 105) wishing to become a user of the PPES 100 may become a registered user, select a password, etc., by accessing the OPS website (not shown) via a computer (e.g. desktop or mobile) having internet 101 access. In an alternate embodiment, a person may register as a user and access the PPES 100 using a phone to communicate over a wired or wireless network (not shown) with the telecommunication interface 115 and IVR 117 using voice or touchtone commands.

The financial institution 102 may execute financial services, such as electronic fund transfers, as well as provide information to the PPES 100 (e.g. beneficiary 103 and cardholder 105 account information). In a preferred embodiment, the financial institution 102 making an electronic funds transfer will allow a cardholder 105 to withdraw cash from it (e.g. via the financial institution's 102 ATM network, over the counter, etc. (not shown)). Alternatively, the proceeds of the beneficiary's 103 electronic fund transfer will be deposited to an account designated by the cardholder 105, from which the cardholder 105 may withdraw cash, or draw against (e.g. a debit card issued by the OPS). The financial institution 102, by providing a physical location (ATM, cashier window) for a cardholder 105 to obtain cash, may be able to acquire a new customer by offering other "off-line" services, such as a debt consolidation loan.

Figure 2:
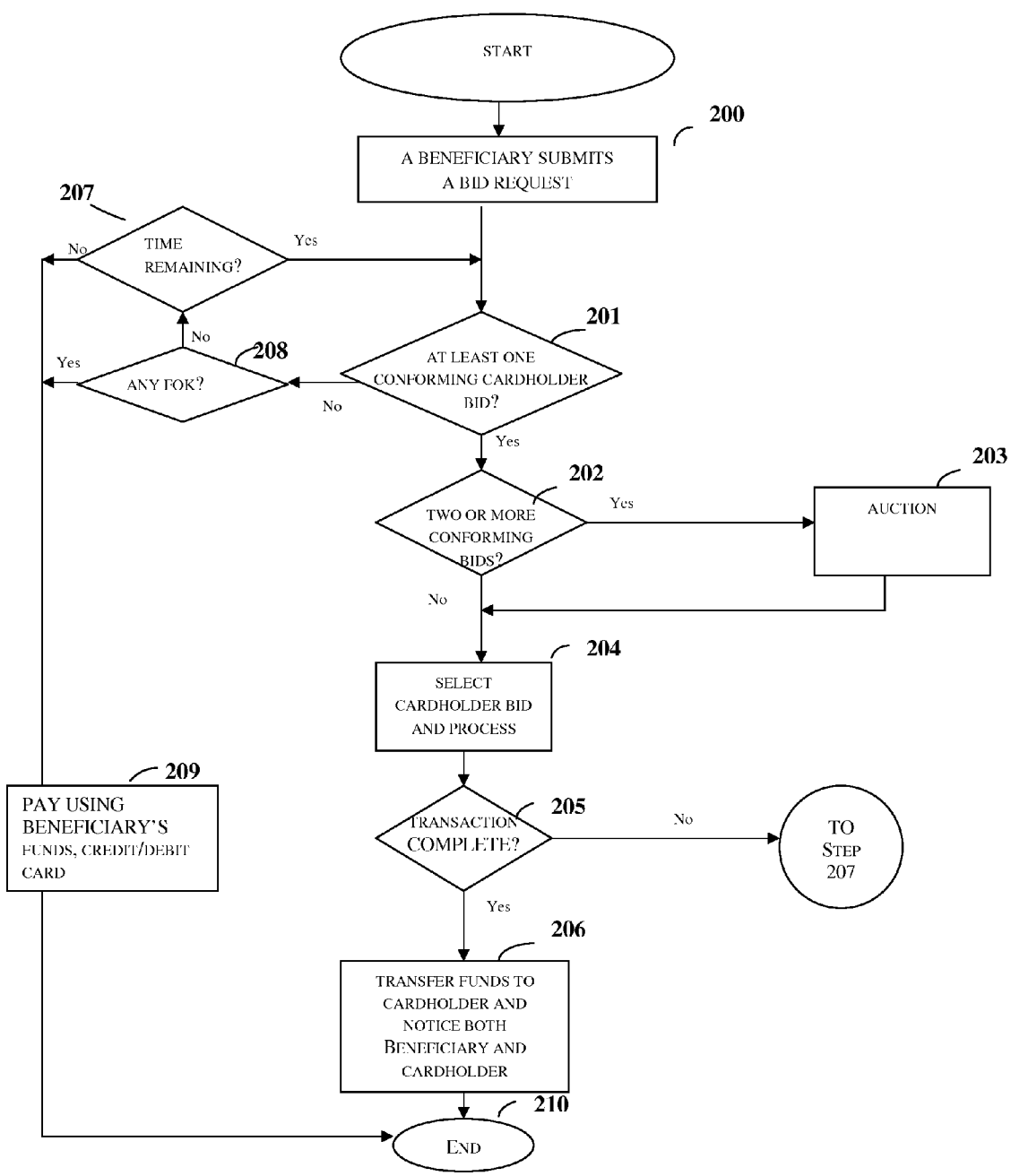
FIG. 2 is a flow diagram illustrating an exemplary method for making a purchase-payment exchange online in accordance with certain embodiments of the present invention.

FIG. 2 is a flowchart demonstrating, in further detail, one method of employing the PPES 100 such as that of FIG. 1, to make a synthetic cash advance using a purchase-payment exchange between a beneficiary 103 and a cardholder 105, according to one embodiment of the this invention.

In this embodiment, a beneficiary 103 having a bank account (e.g. demand deposit account) with a balance sufficient to make a purchase of an item in cash (e.g. EFT), may obtain a selected item at a discount using this invention. The beneficiary 103 selects a good or service (collectively "item") to purchase from an online merchant 104.

While the example will discuss the transaction as a "purchase of an item", it should be understood that the invention can also be used for the payment of a bill (e.g. mortgage payment) when the beneficiary's 103 payee (e.g. mortgagor) accepts credit card payments. Therefore, the term "purchase" should be construed broadly to include the payment of any debt, as well as the purchase of an item or service. Further, while the example uses an "online merchant", the invention includes any payee (person or entity) capable of being paid with a cardholder's 105 credit card online or offline (e.g. fax transmittal, or cardholder 105 call-in/walk-in). So, for example, an agreement may be made online between a beneficiary 103 and a cardholder 105, but the cardholder 105 may complete his part of the deal (pay a beneficiary's 103 outstanding debt) offline. Likewise, a cardholder 105 may make an offline purchase for the beneficiary 103, who then makes an offline payment (e.g. mail a check) to the cardholder 105.

The beneficiary 103 and cardholder 105 may have an account with the PPES 100, or may register and initiate the following procedure at the time of submitting a beneficiary 103 bid or cardholder 105 bid. In a preferred embodiment, the PPES 100 will be implemented by an OPS that has previously verified the identity of each participant, and has validated the relevant financial information of each (e.g. account ownership, availability of funds/credit, transaction authorization via PIN, etc.) through a query to each participant's financial institution 102, credit service, or other external financial information source, and has issued one or more unique identifiers (e.g. username and password) for each beneficiary 103 and cardholder 105 to complete a purchase-payment exchange.

The OPS acting as a facilitator among the beneficiary 103, financial institution 102, cardholder 105 and merchant 104 limits the disclosure of financial information and other personal information of any participant, and provides reliability in completing a financial transaction.

In a preferred embodiment, the OPS does not escrow the beneficiary's 103 funds, but rather instructs the beneficiary's 103 financial institution 102 to make an electronic fund transfer to the cardholder 105 (and the OPS) after verifying that the cardholder 105 has completed an agreed upon purchase for the beneficiary 103. In this way, the OPS's PPES 100 provides a secure venue for participants to make a purchase-payment exchange.

In an alternate embodiment, the OPS may hold the beneficiary's 103 funds in escrow (or use a third party escrow) and release the beneficiary 103 funds to the cardholder 105 upon verification of the cardholder's 105 purchase being completed for the beneficiary 103. Further, the OPS may auction a beneficiary's 103 bid, when there is time to do so, and there are at least two potential cardholders 105 and 106 who have an indicated an interest in bidding for the cash amount (i.e. purchase price minus minimum discount) in the beneficiary's 103 bid.

At step 200, a beneficiary 103 submits a bid to the OPS's PPES 100. The bid contains "bid conditions" and "purchase information". The bid conditions contain the total price a cardholder 105 must pay (purchase price) to complete the proposed transaction, the minimum discount from the purchase price that the beneficiary 103 will accept, and the credit card type(s) that are acceptable to the payee. Additionally, the beneficiary's 103 bid conditions may include the time a bid will remain open. The PPES 100 may be allowed to round a purchase price and/or discount up to the nearest whole dollar.

In one embodiment, a beneficiary 103 may post a bid on the OPS's website (not shown) for a cardholder 105, to view and submit a "conforming bid". A cardholder's 105 "conforming bid" is a cardholder's 105 bid that fulfills the beneficiary's 103 minimum bid conditions (i.e. price, minimum discount, and a credit card type). A cardholder 105 may submit a bid that exceeds the beneficiary's 103 minimum discount amount (i.e. the cardholder 105 may accept less money than the difference between the purchase price and the beneficiary's 103 minimum discount).

Beneficiary 103 bids may be categorized by a purchase price range (e.g. $40.00-$99.99, $100-$200, etc.), an acceptable credit card (e.g. Credit Card No. 1), a minimum discount (expressed as a dollar amount or percentage of the purchase price) or other suitable category.

For example, if the beneficiary's 103 bid is categorized by a purchase price range, and an item's purchase price is $200.00, a cardholder 105 who logs into the PPES 100 and selects a purchase price range of $100-200, may see the following:

| Bid Conditions | |
| --- | --- |
| Purchase Price: | $200.00 |
| Minimum Discount: | $15.00 |
| Card(s): | Credit Card No. 1, or Credit Card No. 2 |
| Time remaining: | 00 hours 15 minutes |

An interested cardholder 105 could then submit a cardholder 105 bid to make a $200.00 purchase with a Credit Card No. 1 credit card for the beneficiary 103, and agree to accept $185.00 or less (since the beneficiary's 103 minimum discount is $15.00).

In an auction for a beneficiary's 103 bid, a cardholder 105 whose conforming bid had the greatest discount at the end of an auction could be selected by the PPES 100 as the "winning bid". The winning cardholder 105 will receive the "purchase price", less the OPS's commission/transaction fee and beneficiary's 103 discount (or the cardholder's 105 submitted discount, whichever is greater). In a preferred embodiment the beneficiary 103 pays any transaction fee or commission (collectively "fee") to the PPES 100. However a fee may be charged (or waived) in full or in part to each or any participant by the PPES 100 to encourage use of the PPES 100 and promote good will among the participants.

When two or more cardholder 105 & 106 bids tie, the PPES 100 may select the winning bid by choosing the conforming bid submitted first in time. Alternatively, the PPES 100 may allow the tying cardholders 105 & 106 to submit revised bids (with the previous bid being a floor) for a second auction round, or employ other suitable tie breaking methods know in the auction art.

Purchase information includes all other information necessary for the completion of a proposed transaction. For example, the purchase information may include the description of the item, merchant site, delivery method, destination, etc. In a preferred embodiment, the purchase information will be supplied to the online merchant 104 by the PPES 100 (having previously been supplied to the PPES 100 by the beneficiary 103).

For example, the beneficiary 103 may submit a bid having bid conditions and purchase information to the PPES 100, such as:

| Bid conditions | | Purchase Information | |
|---|---|---|---|
| Purchase price | $1,000.00 | Product Description: | ABC Widget, model 12345 |
| Minimum discount | $50.00 | Quantity: | 1 |
| Card(s) | Credit Card No. 1 | Company: | AnyCo.com |
| | | Destination: | 789 Anywhere Street, Small Town, Ohio, U.S.A. 99999 |
| | | Delivery method: | U.S. standard mail |
| | | Payee accepts: | Credit Card No. 1 |

In a preferred embodiment, the cardholder 105 will be able to see the Beneficiary's 103 "bid conditions" portion of a bid to submit a conforming bid. In an alternate embodiment, the beneficiary's 103 "Minimum discount" condition will not be viewable by the cardholder 105.

In a preferred embodiment, certain information may be withheld from the cardholder 105, such as the beneficiary's 103 address or phone number, to shield the beneficiary's 103 privacy, and prevent the PPES 100 from being circumvented in the future. In an alternate embodiment, for an additional fee (or free for a qualifying high volume beneficiary 103 user of the PPES 100) all purchased items will be deliverable to the OPS, who will then reship the item(s) to the beneficiary 103, to further shield the beneficiary's 103 information.

In a preferred embodiment, a cardholder 105 may submit a payee restriction to the PPES 100, so that the cardholder's 105 credit card will not be used to complete a financial transaction that the cardholder 105 would not complete for him/herself (e.g. not for use to purchase pornography).

In a preferred embodiment, the beneficiary 103 will have a verified payment source and will have preauthorized the PPES 100 to complete the beneficiary's 103 purchase if no conforming cardholder 105 bid is submitted within the time limit set by the beneficiary 103 or PPES 100. For example, the OPS's PPES 100 may be pre-authorized to direct the beneficiary's 103 financial institution 102 to pay for the beneficiary's 103 purchase in case no timely conforming cardholder 105 bid is submitted. In this way, the beneficiary 103 will be able to complete the purchase, or timely make a payment, notwithstanding the lack of a conforming cardholder 105 bid.

In an alternate embodiment, the OPS may require that the beneficiary 103 transfer funds to the PPES 100, sufficient to complete any purchase, before allowing the beneficiary 103 to submit a bid. In this embodiment, the OPS holds the beneficiary's 103 funds in escrow (or uses a third party escrow) pending the outcome of any submitted beneficiary 103 bid. If a beneficiary's 103 bid cannot be matched to a conforming cardholder 105 bid, or if the beneficiary 103 cancels the purchase before the beneficiary's 103 bid is accepted, the beneficiary's 103 funds may be returned, or left with the OPS for a later beneficiary 103 purchase.

In another embodiment, a cardholder 105 who wants to obtain cash may submit a "cardholder 105 bid" to the PPES 100. In this embodiment the cardholder 105 offers his credit card to be used to complete any purchase, preferably within a purchase price range, without seeing a beneficiary's 103 bid.

For example, a cardholder 105 who wants to get cash, may submit a cardholder 105 bid to the PPES 100 of:

| | |
|---|---|
| Purchase Price Range: | $300-$500.00 |
| Maximum Discount: | 10% |
| Card(s) on file: | Credit Card No. 1 |
| Time remaining: | 2 hours, 00 minutes |

Any beneficiary 103 who submits a timely bid to the PPES 100 with bid conditions that can be satisfied by the cardholder's 105 bid, could be matched and processed by the PPES 100.

For example, if a beneficiary 103 submitted a bid with a bid condition of "Fill or Kill" (FOK), purchase price $450.00, Credit Card No. 1, minimum discount $25.00", the cardholder's 105 bid could be matched to it and processed. Since $450.00 falls within the cardholder's 105 selected dollar range (i.e. $300-$500), the cardholder's 105 credit card is "Credit Card No. 1", and cardholder's 105 maximum discount (i.e. $45.00, or 10% of $450.00) is greater than the beneficiary's 103 minimum discount of $25.00, the participant's (cardholder 105 and beneficiary 103) bids could be matched and processed.

In a preferred embodiment, continuing with the same example, the PPES 100 may transfer the purchase price to the cardholder 105, minus the cardholder's 105 (greater) maximum discount of $45.00 (the entire 10%). In an alternate embodiment, the PPES 100 may increase the cardholder's 105 payout by transferring an amount to the cardholder 105 equal to the purchase price, minus the beneficiary's 103 minimum discount of $25.00. In a further alternate embodiment, the PPES 100 may select yet a different cardholder 105 payout (e.g. split the difference between the beneficiary's 103 minimum discount and cardholder's 105 maximum discount), to encourage use of the PPES 100, and a sense of fair treatment among the participants.

In an alternate embodiment, two or more beneficiary 103 bids (e.g. two different beneficiary's 103, or one beneficiary 103 with two bids) may be aggregated to fulfill a credit cardholder's 105 bid, as long as the relevant aggregate amounts (i.e. price, maximum discount) do not exceed the cardholder's price range and discount.

In a preferred embodiment, the cardholder 105 will preauthorize the PPES 100 to complete any transaction(s) that meets the cardholder's 105 submitted bid criteria. In an alternate embodiment, the cardholder 105 may be notified of the match and asked to confirm the proposed transaction before processing any credit card transaction.

In a preferred embodiment, the beneficiary 103 or PPES 100 may establish a time limit that a beneficiary's 103 bid may remain open for a cardholder's 105 conforming bid to be submitted to the PPES 100 and matched with the beneficiary's 103 bid.

A bid time condition may allow a beneficiary's 103 bid to remain open for a fixed period, or require that the beneficiary's 103 bid be matched immediately or cancelled (i.e. a "fill or kill" (FOK) bid condition). In an alternate embodiment, a time condition may allow a bid to remain open with a "good until cancelled" (GTC) condition.

In an alternate embodiment, when an online merchant 104, or other payee, is able and willing to accept two or more credit cards to complete a single purchase, the PPES 100 may aggregate two or more cardholder 105 & 106 bids (or one cardholder's 105 two or more credit cards) to fulfill the beneficiary's 103 bid, as long as the combined bids fulfill the respective beneficiary's 103 minimum bid conditions, and individually do not exceed any single cardholder's 105 or 106 maximum purchase price range and discount.

For example, two cardholders 105 & 106 may submit bids for a purchase price range that they hope will match the minimum bid criteria of a beneficiary's 103 bid not seen by them. One cardholder 105 submits a bid for a $400-$600 range, payment with a Credit Card No. 1 credit card, and a maximum discount of $20.00. The second cardholder #2 106 submits a bid for a $300-$400.00 range, payment with a Credit Card No. 1 credit card, and a maximum discount of $40.00. Using the aforementioned $1,000.00 widget example, the PPES 100 may aggregate the two cardholder 105 & 106 bids, since the purchase price of $1,000.00 is equal to the combined maximum range of the cardholders' 105 & 106 bids (i.e. $600.00 and $400.00), the combined maximum discount ($60.00) willing to be accepted by the cardholders 105 & 106 is greater than the beneficiary's 103 minimum discount ($50.00), and each cardholder 105 and 106 offers a credit card (No. 1) acceptable by the payee.

Once the beneficiary 103 submits his bid at step 200, and the PPES 100 proceeds to step 201 where it is determined whether the PPES 100 has a conforming cardholder 105 bid by querying the cardholder database 113.

In a preferred embodiment, a cardholder 105 will also be able to submit a time limit condition on a bid. For example, a cardholder 105 may submit a bid that is good for the "Day" (e.g. the bid remains open until midnight or for 24 hours) and if not matched, is cancelled. Additionally, the cardholder 105 may agree that the PPES 100 is allowed to "reserve" an amount of credit on the cardholder's 105 card for a time (e.g. the duration that a cardholder 105 or beneficiary bid remains open), to assure that sufficient credit is available to complete a transaction, if the cardholder's 105 bid is selected or matched to a beneficiary's 103 bid.

In an alternate embodiment, a cardholder 105 may be requested to provide a second credit card, or other financial account (DDA checking account) information to the PPES 100, and authorize the PPES 100 to use the second credit card/financial account as back up to complete a transaction, if the cardholder's 105 primary card fails to complete the transaction.

If it is determined that no conforming cardholder 105 bid exists in the cardholder database 113, the PPES 100 proceeds to step 208, where it is determined if the beneficiary's 103 bid has a FOK condition by querying the beneficiary 103 database 112. If so, the PPES 100 continues to step 209, where the purchase is completed using the beneficiary's 103 funds. The PPES 100 may direct the beneficiary's 103 financial institution 102 to complete the beneficiary's 103 purchase. In an alternate embodiment, the PPES 100 may complete the purchase from funds held in escrow by the PPES 100. The PPES 100 then proceeds to step 210 and ends. In an alternate embodiment, when a FOK condition exists and there is no conforming bid, the purchase is merely canceled, instead of completing the purchase using the beneficiary's 103 funds/credit card.

If at step 208, it is determined that no FOK condition exists, the PPES 100 proceeds to step 207, where a query is made to the beneficiary database 112 to determine whether there is any time remaining for a conforming bid to be submitted to complete the beneficiary's 103 purchase. If no time remains for a cardholder 105 to submit a conforming bid, the PPES 100 proceeds to step 209, where the purchase is completed using the beneficiary's 103 funds (or alternatively the beneficiary's bid is canceled). The PPES 100 then proceeds to step 210 and ends.

In an alternate embodiment, the PPES 100 may notify the beneficiary 103 of his bid's status (e.g. no conforming cardholder 105 bid), and give the beneficiary 103 an opportunity to extend the time the bid remains open, cancel the purchase, or complete the purchase using the beneficiary's 103 funds/credit card.

If at step 207, it is determined that time remains for a cardholder's 105 conforming bid to be submitted, the PPES 100 cycles back to step 201 to determine if a conforming bid exists by querying the cardholder database 113. The PPES 100 will continue to cycle thru the aforementioned steps (e.g. in regular, repeating intervals) until time runs out (e.g. as set by the beneficiary 103), or until at least one conforming cardholder 105 bid is received.

If at step 201, it is determined that a conforming cardholder 105 bid has been submitted to the PPES 100, the PPES 100 proceeds to step 202 where it is determined if the PPES 100 has received two or more conforming bids by querying the cardholder database 113. At step 202, if there are not two or more conforming bids, the PPES 100 proceeds to step 204.

In a preferred embodiment, when two or more conforming cardholder bids 105 & 106 have been submitted to the PPES 100, the PPES 100 proceeds to step 203 to auction the beneficiary's 103 bid. Cardholders 105 & 106 with conforming bids may be notified (e.g. by email, text message) that the beneficiary's 103 bid will be filled by auction.

A link and an auction identification number (ID) may be communicated (e.g. via email, SMS, etc.) to the cardholders 105 & 106 to participate in the auction. Cardholders 105 & 106 who follow the link, and log-in using the auction ID, may participate in the auction. The PPES 100 or beneficiary 103 may set a time limit on the auction.

In a preferred embodiment, cardholders may be allowed to see other cardholder bids and revise the maximum discount they are willing to accept, to compete for the beneficiary's 103 bid until the auction ends. Further, the PPES 100 may display (via a computer screen (not shown)) what the cardholder 105 will net out (receive) if the cardholder's 105 bid is accepted, so as to prevent a cardholder 105 from making a choice that would be less advantageous than simply using the credit card's cash advance feature.

In an alternate embodiment, the cardholder 105 will not know how many cardholders are participating in an auction, or what their bids are. These and other auction methods familiar to those skilled in the art may be used by the PPES 100.

In an alternate embodiment, the PPES 100 at 201 may select the first conforming cardholder 105 bid submitted, notwithstanding that more than one conforming cardholder 106 bid exists.

At step 203, the conforming cardholder 105 bid with the greatest discount from the purchase price, will be selected as the winning bid. Once a winning bid is selected, the PPES 100 proceeds to step 204. Conducting an auction, breaking ties, etc. are well known by those skilled in the art, and so not detailed further herein.

At step 204, the winning, first submitted, or only, conforming bid is processed. The PPES 100 uses the winning cardholder's 105 credit card to complete the purchase for the beneficiary 103.

The PPES 100 then proceeds to step 205 where it is determined if the financial transaction was successfully completed (e.g. credit charge was approved, item shipped). Upon verification of transaction completion, the PPES 100 proceeds to step 206. The PPES 100 is pre-authorized to instruct the beneficiary's 103 financial institution 102 to make an electronic fund transfer (EFT) from the beneficiary's 103 DDA (or other account), to the cardholder's 105 designated account. A service fee, commission may likewise be collected by the PPES 100 from the beneficiary 103, cardholder 105, or both.

In an alternate embodiment, the PPES 100 will transfer beneficiary 103 funds to the cardholder 105 (and deduct a service fee, commission, etc.), from funds held in escrow when verification is made that the cardholder 105 has completed the financial transaction for the beneficiary 103.

The PPES 100 sends a notice (e.g. email, text message, etc.) to both the beneficiary 103 and cardholder 105 that the financial transaction(s) was completed. The PPES 100 proceeds to step 210 and ends.

At step 205, when a transaction was not successfully completed, the PPES 100 proceeds to step 207 and queries the beneficiary database 112 to determine if there is any time remaining to fulfill the beneficiary's 103 bid. If time remains, the PPES 100 cycles back to step 201. If no time remains for a cardholder 105 to submit a conforming bid, the PPES 100 proceeds to step 209, where the purchase is completed using the beneficiary's 103 funds. The PPES 100 then proceeds to step 210 and ends.

In an alternate embodiment, the PPES 100 may notify the beneficiary 103 of the beneficiary's 103 bid status (e.g. no conforming cardholder 105 bid to fulfill the beneficiary's 103 bid), or that the cardholder's 105 purchase transaction failed, and give the beneficiary 103 an opportunity to extend the time the beneficiary's 103 bid remains open, cancel the beneficiary's 103 bid, or complete the purchase using the beneficiary's 103 funds or credit card.

In yet another alternate embodiment, where the transaction did not complete, before proceeding to step 207, the cardholder 105 whose charge did not go through (e.g. purchase exceeds card's credit limit) may be allowed an opportunity to perform the terms of the winning bid, using a second (backup) credit card, preferably already registered with the PPES 100, that the PPES 100 has been preauthorized to access for such use. In yet another alternate embodiment, where a cardholder 105 bid was selected by way of an auction, the PPES 100 may attempt to process the second (greatest discount) conforming cardholder 106 bid submitted before proceeding to step 207, after obtaining permission from the second place cardholder 106 and/or beneficiary 103.

As may be seen from the foregoing, the present invention provides system and method for a credit cardholder to obtain a synthetic cash advance via a purchase-payment exchange, at the card's purchase interest rate, as well as enabling the card holder to obtain a synthetic cash advance with a smaller transaction cost (by setting a cardholder's maximum discount less than the credit card's minimum cash advance transaction fee). Further, since the cardholder is making a "purchase", he/she may be able to obtain more cash than the card's lesser "cash advance" limit. Additionally, the invention provides a beneficiary a means to obtain an item, or have a payment made on his behalf, at a discount.

The disclosed invention creates a new source of revenue for online payment solution providers (OPS) and online auction providers. Finally, the invention creates a competitive advantage for card issuers in competing for small loans normally serviced by "payday loan" businesses, by making funds available to existing cardholder clients at a lower interest rate and longer payback period.

It should be appreciated that the exemplary aspects and features of the present invention as described above are not intended to be interpreted as required or essential elements of the invention, unless explicitly stated as such. It should also be appreciated that the foregoing description of exemplary embodiments was provided by way of illustration only and that many other modifications, features, embodiments and operating environments are possible. Accordingly, the scope of the present invention should be limited only by the claims to follow.

I claim:

1. A system for a credit cardholder to obtain synthetic cash advance in exchange for completing a financial transaction for a beneficiary, comprising:
   means for a cardholder to submit a bid to complete a financial transaction chosen by a beneficiary using the cardholder's credit card, in exchange for the cardholder receiving the beneficiary's cash in an amount that is less than the beneficiary's proposed financial transaction, wherein the cardholder's bid comprises a discount from a purchase price, the discount further comprising the difference between a charge to the cardholder's credit card and the amount the cardholder is willing to receive in exchange for completing the financial transaction for the beneficiary;
   means to select the cardholder's bid;
   means for using the cardholder's credit card to complete the financial transaction for the beneficiary; and
   means for making an electronic fund transfer to the cardholder of cash received from the beneficiary, wherein the cash is a synthetic cash advance.

2. The system of claim 1, wherein the electronic funds transferred to the cardholder is less than the amount paid by the cardholder to complete the financial transaction.

3. The system of claim 1, wherein the cardholder's bid further comprises a credit card to be used to complete the financial transaction.

4. the system of claim 1, further comprising means to select the cardholder bid from a plurality of cardholder bids.

5. The system of claim 4, further comprising means to select the cardholder bid having the greatest discount.

6. The system of claim 1, further comprising means for an online payment solution provider to direct a beneficiary's financial institution to make an electronic fund transfer to the cardholder.

7. The system of claim 1, further comprising means for an online payment solution provider to pay a cardholder with beneficiary funds held in escrow by the online payment solution provider.

8. The system of claim 1, wherein the cardholder submits the cardholder bid without first seeing a beneficiary bid.

9. The system of claim 1, further comprising a means for selecting two credit cardholder bids to complete a financial transaction for a beneficiary, when a credit cardholder bid's purchase price range is insufficient to complete a financial transaction for a beneficiary.

10. The system of claim 9, wherein an electronic fund transfer is made to each cardholder that is less than the amount separately paid by each cardholder.

11. A method for a beneficiary to obtain an item at a discount, the method comprising:
    receiving in a purchase-payment exchange system a beneficiary's bid request to have a credit cardholder make a purchase of an item for the beneficiary using the credit cardholder's credit card;
    receiving a cardholder's conforming bid by the system that fulfills the beneficiary's minimum bid request conditions, wherein the cardholder's bid comprises a discount from a purchase price, the discount further comprising the difference between a charge to the cardholder's credit card and the amount the cardholder is willing to receive in exchange for completing the financial transaction for the beneficiary;
    using a credit card of the cardholder by the system to complete the purchase for the beneficiary; and
    paying the cardholder by the system with an amount of money provided by the beneficiary that is less than the item's purchase price, in exchange for completing the purchase with the cardholder's credit card.

12. The method of claim 11, wherein the purchase of the item is a group, the group comprising a purchase of an item selected by the beneficiary, a payment for a service selected by the beneficiary, and a payment of a debt owed by the beneficiary.

13. The method of claim 11, wherein the cardholder's conforming bid further comprises an offer by the cardholder to complete a purchase for the beneficiary using a credit card that is acceptable to a payee, and a discount from the purchase price, that is equal to or greater than a beneficiary's minimum discount.

14. The method of claim 11, further comprising the step of selecting the conforming cardholder bid via an auction.

15. A method for an online payment solution provider to facilitate a purchase-payment exchange between a beneficiary and a cardholder, comprising:
    receiving in a purchase-payment exchange system a beneficiary bid request, wherein the request comprises use of a credit cardholder's credit card to complete a purchase for the beneficiary, in exchange for an amount of the beneficiary's cash that is less than the price of the item to be purchased using the cardholder's credit card;
    receiving by the system a credit cardholder's conforming bid that fulfills the beneficiary's minimum bid request conditions, wherein the cardholder's bid comprises a discount from a purchase price, the discount further comprising the difference between a charge to the cardholder's credit card and the amount the cardholder is willing to receive in exchange for completing the financial transaction for the beneficiary;
    selecting by the system the cardholder's conforming bid;
    paying for the purchase by the system using the cardholder's credit card; and
    making an electronic fund transfer by the system to the cardholder in an amount that is less than the amount charged to the cardholder's credit card to complete the purchase for the beneficiary.

16. The method of claim 15, wherein the beneficiary has pre-approved the beneficiary's financial institution to pay the credit cardholder when directed by the online payment solution provider.

17. The method of claim 15, wherein the online payment solution provider uses the beneficiary's funds held in escrow to pay for the selected purchase, when no credit cardholder's conforming bid is received.

18. The method of claim 15, wherein the online payment solution provider performs an auction to determine what conforming bid to select, when more than one conforming bid is received.

19. The system of claim 1, further comprising the credit cardholder receiving the beneficiary's cash at the credit card's purchase interest rate.

\* \* \* \* \*